May 31, 1966  H. H. GOVE ETAL  3,253,300
MIXING VALVE
Filed Jan. 31, 1964 2 Sheets-Sheet 1
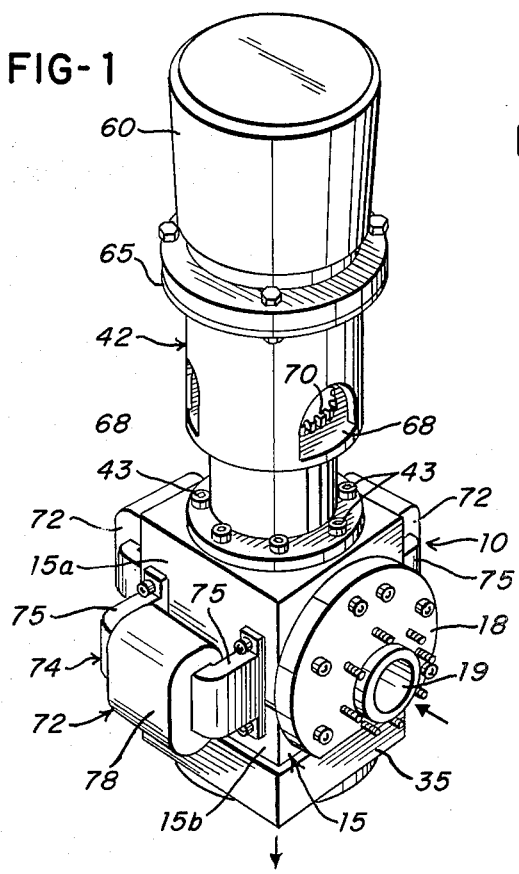
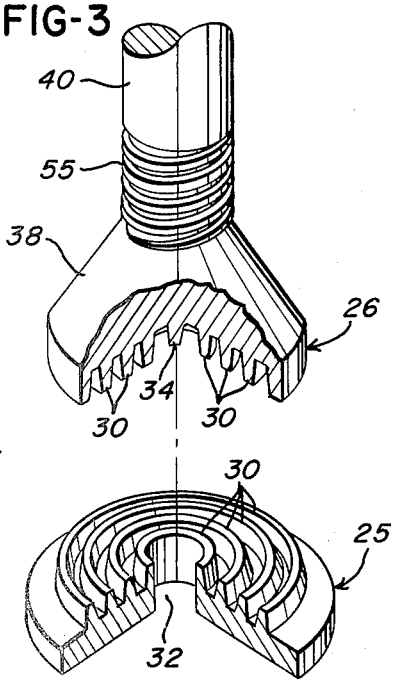
INVENTORS
HARVEY H. GOVE &
ROBERT E. HOFFMAN
BY
*Marechal, Biebel, French & Bugg*
ATTORNEYS

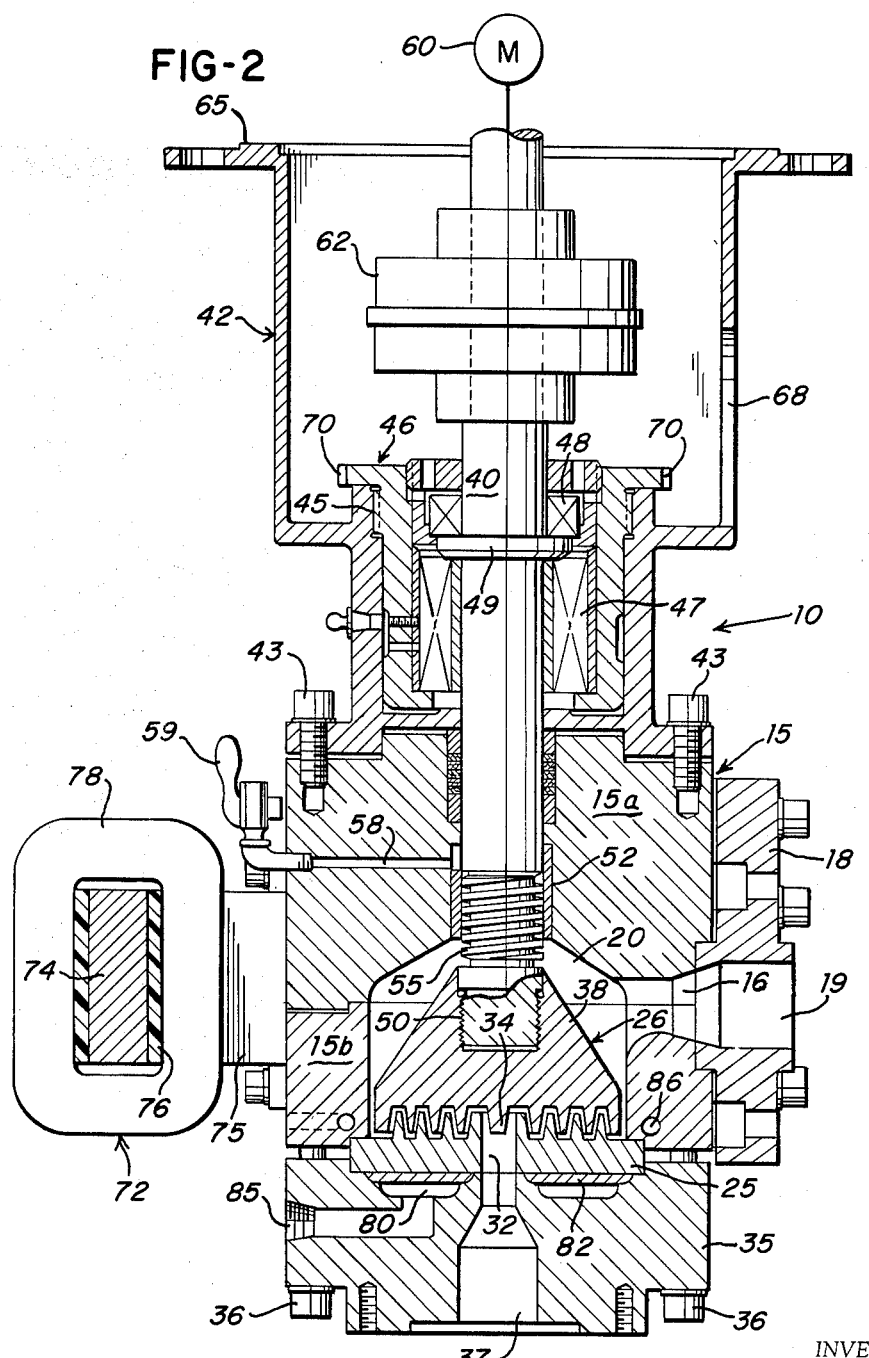

United States Patent Office 3,253,300
Patented May 31, 1966

3,253,300
MIXING VALVE
Harvey H. Gove and Robert E. Hoffman, both of Hamilton, Ohio, assignors to The Black Clawson Company, Hamilton, Ohio, a corporation of Ohio
Filed Jan. 31, 1964, Ser. No. 341,645
6 Claims. (Cl. 18—2)

This invention relates to plastic mixing valves for extruders and more particularly to a hot feed mixing head external of the extruder.

In many extruder applications, there exists a requirement for a thorough mixing of the plastic constituents independent of the operating conditions within the extruder. In such instances, the optimum consistency cannot always be obtained through the mixing head at the end of the extruder barrel, and often further mixing under particular conditions is desirable to achieve the desired quality of a final product.

This invention provides an external hot feed mixing head within which the desired degree of mixing and blending can be controlled apart from the extruder. Certain of the advantages of this invention consist of the ability to employ an independent mixing speed, that is a mixing speed which is independent of the speed of rotation of the extruder screw, and independent pressure and temperature control, resulting in a controlled amount of mix and shear to the plastic melt. The external mixing valve of this invention preferably employs a mixing head which defines a tortuous clearance space between a fixed valve member and a rotatably driven valve member, with the space being of controlled and adjustable dimensions. There is also preferably provided cooling passageways for removing excess heat which is formed at the valve members, in combination with induction heaters for maintaining a desired temperature, with the result that the plastic is held within desired temperature limits throughout the mixing thereof.

The apparatus of this invention has particular utility for the thorough mixing and blending of a plastic with another product, such as a coloring agent, a lubricity agent, a pigment, an extender, or the like. As an example it is known that certain coloring pigments, such as phthalocyanine blues or greens, are extremely difficult to disperse within the plastic melt. This apparatus is particularly useful in the blow molding of plastic bottles and the like for achieving uniform color density and dispersion in the finished article.

A further important advantage to blow molding is the control of the "swell" of the plastic upon leaving the mold or die. The ability in this valve to control temperature, pressure and shear, independent of the extruder, provides a means for controlling the "swell," thereby providing a more uniform wall thickness of the blown article, thus reducing waste and possible rejections.

An important object of this invention is the provision of a mixing valve for use external to a plastic extruder.

Another object of this invention is the provision of an external mixing valve in which the mixing parameters can be controlled separately and independently of those of the extruder, including the separate control of pressure, shear and temperature.

A further object of this invention is the provision of an external mixing valve having a mixing head consisting of fixed and rotatable valve members provided with a plurality of concentric, interfitting rings.

A still further object of this invention is the provision of an external mixing valve having means for cooling the mixing head for removal of excess temperature due to the friction or working of the plastic at the mixing head.

Another object of this invention is the provision of an external mixing valve for improving dispersion of an added constituent within and throughout a plastic product.

These and other objects and advantages of the invention will be apparent from the following description, the accompanying drawings and the appended claims.

In the drawings:

FIG. 1 is a perspective view of an external hot feed mixing head constructed according to this invention;

FIG. 2 is a vertical section on a somewhat enlarged scale through the head of FIG. 1; and FIG. 3 is an exploded and partially broken away view of the mixing head valve components employed in this invention.

This invention utilizes some of the teachings of the copending application of Hanvill, Serial No. 439,510, filed February 24, 1965 as a continuation of Serial No. 115,160, filed June 6, 1961 now abandoned, and assigned to the same assignee as this invention. In the above-identified copending application, there is described and claimed a mixing head wherein a fixed valve member and a rotatable valve member are formed with a plurality of concentric, interfitting rings which define therebetween a labyrinth-like space of decreasing volume with decreasing radial distance from the center. This valve construction is preferably utilized in the present invention due to its superior mixing ability, and it is ideally suited for the independent control of the speed of rotation and the spacing between the parts.

Referring now to the figures of the drawings which illustrate a preferred embodiment of the invention, an external plastic hot feed mixing valve is shown at 10 in FIG. 1 adapted for attachment to receive molten plastic directly from an extruder. The valve 10, as shown in FIG. 3, includes a two-piece valve body 15, for the convenience of manufacture, comprising an upper body portion 15a and a lower body portion 15b. The valve body 15 includes a means defining an inlet passageway 16 which is adapted to receive molten plastic from an extruder. The valve 10 may conveniently be provided with an adapter plate 18 which has an opening 19 in communication with the body inlet 16, for adapting the valve 10 for suitable connection either directly to the head of a screw extruder or to a passageway leading therefrom.

The valve body 15 includes means defining a central enlarged cavity 20 which is in communication with the inlet 16. The cavity 20 preferably opens downwardly at right angles to the inlet 16.

The mixing valve 10 includes a mixing head which is formed in two parts, including a first valve member 25 which is received on the body 15 in closing relation to the cavity 20. A second valve member 26 is received above the first member 25 wholly within the body cavity 20 and forms with the member 25 a mixing valve within the body 15.

The mixing head members 25 and 26 are preferably constructed according to the above-identified application of Hanvill and are formed with concentric, interfitting rings, as clearly shown in FIG. 3. The rings 30 preferably have outer lands which lie generally in a plane at right angles to the axis, and are formed with generally straight sloping sides and resemble, in section, truncated cones. The rings are peripherally continuous and form interfitting axial raised portions and depressions.

The fixed valve member 25 is provided with an axial outlet passageway 32 which forms the outlet of the mixing valve. The second or rotatable member 26 is provided with a truncated conical projection 34 which is received within the opening 32 and provides the final restriction for the flow of plastic therethrough.

It can therefore be seen from an examination of FIGS. 2 and 3 that the plastic material will flow from the inlet 16 into the interior of the cavity 20. The upper surface 38 of the member 26 slopes uniformly outwardly toward the rings 30 and forms a clearance space with the adjacent walls of the cavity 20. The plastic material is caused to flow through the tortuous passageway defined by the interfitting rings 30. It will further be appreciated that the volume decreases with decreasing radial dimension, and accordingly the velocity of the plastic will increase until it reaches a maximum at the annular throat between the projection 34 and the outlet opening 32.

Means for retaining the fixed valve member 25 on the lower body portion 15b in closing relation to the cavity 20 includes an outlet adapter plate 35. The plate 35 is held tightly against the member 25 by bolts 36 extending through the plate 35 into the body 15b. The adapter plate 35 is provided with an outlet passageway 37 in communication with the central opening 32 in the fixed valve member 25. The plate 35 provides the means by which the apparatus may be connected to a converter, such as blow molding apparatus, a die, or a pelletizer.

Means rotatably mounting the second valve member 36 within the cavity 20 includes a shaft 40 which is rotatably received on the body 15. A motor mount 42 is mounted on an upper surface of the body 15 by bolts 43 and is internally threaded at 45 to receive a bearing housing 46. The housing 46 includes a running bearing 47 and a thrust bearing 48, with the shaft 40 being extended therethrough for rotation in these bearings. A collar 49 on the shaft 40 transmits the axial thrust to the bearing 48. Thus, the upper end of the shaft 40 extends externally of the bearing housing 46, and the lower end of the shaft 40 extends into the interior of the cavity 20 and forms, at 50, a threaded driving connection to the rotatable valve member 26.

A sleeve bushing 52 may be receeived in the body portion 15a at the region at which the shaft 40 emerges into the cavity 20. At this region, the shaft 40 is preferably provided with means for preventing the flow of plastic material along the shaft, and this may comprise a reverse flighting 55. Such plastic as may find its way through the flighting 55 may conveniently be removed by a bleed passageway 58 and a spigot 59 to prevent flow into the bearings.

The external valve 10 further includes speed controllable drive motor means which is indicated generally at 60 in FIGS. 1 and 2. The drive motor means 60 preferably consists of a variable speed vertical drive, which may have an output speed variable, for example, between 30 and 300 r.p.m. The motor 60 drives the shaft 40 through a suitable flexible coupling 62, and may be mounted on the flanged upper surface 65 of the motor mount 42.

Means adjustably mounting the shaft 40 for adjusting the spaced apart distance of the valve members 25 and 26 includes the bearing housing 46 and the threaded connection 45. As shown in FIG. 1, a suitable access opening 68 may be provided by which tool may be inserted to engage the peripheral teeth 70 formed on the bearing housing 46 for rotating the housing on the threads 45 within the motor mount 42. This adjustment may be made during the operation of the mixing valve to achieve the desired plastic working pressure. The adjustment should be sufficient to bring the valve portions together to a closed condition with approximately 0.010 inch clearance to an open position where the rings 30 are substantially withdrawn from each other.

The control of the temperature of the plastic material is of the utmost importance in achieving the desired degree of mixing and blending without subjecting the plastic to temperatures which would tend to damage the material, and while maintaining a sufficiently high temperature to prevent solidification and to achieve the desired degree of working of the plastic. To this end, induction heater units 72 are preferably employed, there being three such heaters shown, one for the front surface of the body 15, and one for each of the opposite body sides. The induction heaters may be of the type shown in the copending application of Schroyer et al., Serial No. 127,052, filed July 26, 1961, now Patent No. 3,179,778 and assigned to the same assignee as this application. Thus, the induction heater units 72 include generally U-shaped flux guides 74 with inwardly turned legs 75 held in intimate contact with an outer flat surface of the die body. An insulating coil form 76 is carried on the central portion of the flux guides, and supports an electric coil 78. The heating by the induction heaters of this invention has been found particularly advantageous by providing a uniform depth of heating through the body 15 to the cavity 20.

The working of the plastic material between the rings and depressions of the valve members may, in many instances, cause the temperature of the plastic to rise to a critical value. The apparatus of this invention therefore includes means for cooling the mixing valve members to prevent overheating of the plastic. The outlet adapter plate 35, FIG. 2, is provided with an annular recess 80 in its upper surface closed by an annular plate 82 between the recess 80 and the lower surface of the valve member 25. A passageway 85 leading into the recess 80, and a similar passageway (not shown) leading out of the recess 80 provides the means for circulating a cooling fluid therethrough for cooling the fixed valve member 25. Also, the lower body portion 15b may be provided with a circumferential cooling passageway 86, running in the body next adjacent the valve members at the inlet to the space therebetween, through which a cooling fluid may be circulated, as required.

It is therefore seen that this invention provides an external mixing valve in which the temperature, the pressure, and the mixing speed (shear) can be controlled independently of the conditions within an extruder. Accordingly, with the employment of this invention it is possible to provide a high degree of mixing and dispersion of the constituent parts, such as for uniform dispersion of coloring pigments, additives, and the like, and the elimination of hard spots. It is particularly advantageous to the apparatus of this invention in combination with an existing screw extruder to adapt an extruder to a new use, that is to a new line of production, and to improve the quality of the material therefrom beyond that which would have been possible by the employment of the extruder alone. The employment of the apparatus according to this invention permits thorough color pigment blending at the final processing stage of the plastic material prior to the forming stage thereby eliminating the requirement for special blending or milling equipment ahead of the final extrusion.

The ability in this invention to control the amount of "swell" of a parison makes it particularly useful with blow molding extruding lines. "Swell" is affected by temperature of the plastic, the amount of shear to which the plastic is subjected, and the rate of extrusion. By providing control of each of these factors independently of the extruder, this invention makes practical control of the "swell" possible.

The apparatus of this invention may also be used with advantage to improve the mixing of rerun scrap in process with virgin resin at a higher ratio without loss of product quality. The apparatus may also be used to mix two different polymers to obtain special finished product quality, and is also advantageous in dispersing carbon black which is known to be a difficult substance to disperse.

The apparatus of this invention is also useful as an attachment for an extruder to minimize the problem of surging. This is a particular advantage where surging has been found to be a problem with a given extruder.

By way of specific example, and in no way intended to limit the scope of the invention, an external mixing valve was constructed for operation with a 3.5 inch extruder, and was physically connected directly to the end of the extruder to receive the output therefrom. The particular valve had a 6.5 kilowatt heating capacity, a five horsepower drive motor, and the valve was adjustable between 0.125 and 0.5 inch axial clearance.

A virgin, high density linear polyethylene having a melt index of .3 and a density of .950 was dry mixed with 1.0 percent blue phthalocyanine and 2.0 percent dry white titanium dioxide. The mixing of the powder pigments with the polyethylene was accomplished without the use of a wetting agent, and conveyed to the hopper of the extruder in premixed dry form.

It was found that by operating the valve fifty percent open, and by driving the rotatable valve member at 60 r.p.m., while maintaining a melt temperature of 410°, and a head pressure of 1325 p.s.i., good dispersion and mixing resulted. Under these conditions, the output from the 3.5 inch extruder was fifty pounds per hour at an extruder screw rate of 18 r.p.m.

In a further test, highly satisfactory dispersion of titanium dioxide alone in the same polyethylene of the preceding example was obtained while an extruder shaft was turning 36 r.p.m. providing an output of 139 pounds per hour.

The mixing valve of this invention may also be used as a viscosity breaker for the control or breaking of the viscosity of shear sensitive plastics. For example, polypropylene is sensitive to shear, and the application of this invention of shear to polypropylene may be used to decrease the viscosity and to increase the melt index.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An external plastic mixing valve for attachment to receive a plastic melt from an extruder to subject the plastic material to a controlled degree of mixing and shear, comprising a valve body external to an extruder and having means defining an inlet adapted to receive such plastic melt from an extruder for mixing thereof, means in said body defining a cavity in communication with said inlet, mixing valve means in said body including a first valve member received in closing relation to said cavity and having an outlet port, a second valve member received in said cavity and defining with said first valve member opposed mixing surfaces spaced from each other and defining a tortuous clearance space therebetween of controlled dimensions leading from said cavity to said outlet port, shaft means in said body mounting said second valve member for rotation, and means adjustably mounting said shaft means axially in relation to said first valve member for regulating the effective space between said valve members.

2. An external plastic mixing valve for attachment to receive a plastic melt from an extruder to subject the plastic material to a controlled degree of mixing and shear, comprising a valve body external to an extruder and having means defining an inlet adapted to receive such plastic melt from an extruder for mixing thereof, means in said body defining a cavity in communication with said inlet, mixing valve means in said body including a first valve member received in closing relation to said cavity and having an outlet port, a second valve member received in said cavity and defining with said first valve member opposed mixing surfaces spaced from each other, said surfaces having peripherally continuous rings formed concentrically therein in axial interfitting relation with each other defining a clearance space therebteween leading from said cavity to said outlet port, shaft means in said body mounting said second valve member for rotation, adjustable means for regulating the effective space between said valve members, and controllable motor drive means connected to said shaft for turning said second valve member at a controlled rate in relation to said first valve member.

3. An external plastic mixing valve for attachment to receive a plastic melt from an extruder to subject the plastic material to a controlled degree of mixing and shear, comprising a valve body external to an extruder and having means defining an inlet adapted to receive such plastic melt from an extruder for mixing thereof, means in said body defining a cavity in communication with said inlet, mixing valve means in said body including a first valve member received in closing relation to said cavity and having an outlet port, a second valve member received in said cavity and defining with said first valve member opposed mixing surfaces spaced from each other, said surfaces having alternate axial elevations and depressions formed concentrically therein in interfitting relation with each other defining a tortuous clearance space therebetween of controlled dimensions leading from said cavity to said outlet port, shaft means in said body mounting said second valve member for rotation, means adjustably mounting said shaft means axially in relation to said first valve member for regulating the effective space between said valve members, and controllable motor drive means connected to said shaft for turning said second valve member at a controlled rate in relation to said first valve member.

4. An external plastic mixing valve for extruders, comprising a valve body having inlet means for connection to receive plastic from an extruder and means defining an outlet, a mixing head including first and second valve members in said body each having cooperating plastic material working surfaces comprising a plurality of concentric, axially interfitting alternate raised portions and depressions forming a tortuous plastic material passageway leading generally radially from a region peripheral of said valve members to a region generally centrally thereof, means in one of said valve members defining an outlet opening in communication with said plastic material outlet for the discharge of plastic material therethrough, means rotatably supporting the other of said valve members for rotation relative to said one member, and means for adjusting the spaced apart distance of said members for regulating the plastic material flow through said tortuous passageway.

5. An external plastic mixing valve for extruders, comprising a valve body having means defining an internal cavity and inlet means for connection to receive plastic material from an extruder and opening into said cavity, a mixing head including first and second valve members in said body cavity each having cooperating plastic material working surfaces comprising a plurality of concentric, axially interfitting alternate raised portions and depressions forming a tortuous plastic material passageway leading generally radially from a region of said cavity peripheral of said valve members to a region generally centrally thereof, means in one of said valve members defining an outlet opening for the discharge of plastic material therethrough, means rotatably supporting the other of said valve members for rotation relative to said one member, means for adjusting the spaced apart distance of said members for regulating the plastic material flow through said tortuous passageway, and independent variable speed drive means for said other member for varying the amount of shear on said plastic material between said valve members.

6. An external plastic mixing valve for extruders, comprising a valve body having means defining an internal cavity and inlet means for connection to receive plastic material from an extruder opening into said cavity, a mixing head including first and second valve members in said body cavity each having cooperating plastic material working surfaces comprising a plurality of mutually cooperating portions forming a tortuous plastic material passageway leading from a region of said cavity peripherally of said valve members to a region generally centrally thereof, means in one of said valve members defining an outlet opening for the discharge of plastic material therethrough, means rotatably supporting the other of said valve members for rotation relative to said one member, heating means on said die body for controlling the temperature of the plastic material therein, and means defining a cooling fluid passageway adjacent said valve member surfaces for removing excess heat therefrom as a result of the working of the plastic material.

References Cited by the Examiner

UNITED STATES PATENTS

| | | | |
|---|---|---|---|
| 540,270 | 4/1895 | Parker | 138—43 |
| 2,944,286 | 7/1960 | Kullgren et al. | 18—12 |
| 3,000,618 | 9/1961 | Oalses | 259—9 |
| 3,009,685 | 11/1961 | Rettig | 259—7 |

WILLIAM J. STEPHENSON, *Primary Examiner.*